Oct. 15, 1929.  C. L. BASTIAN  1,731,519
TWO-STAGE FLUID PRESSURE REGULATOR
Filed July 23, 1926
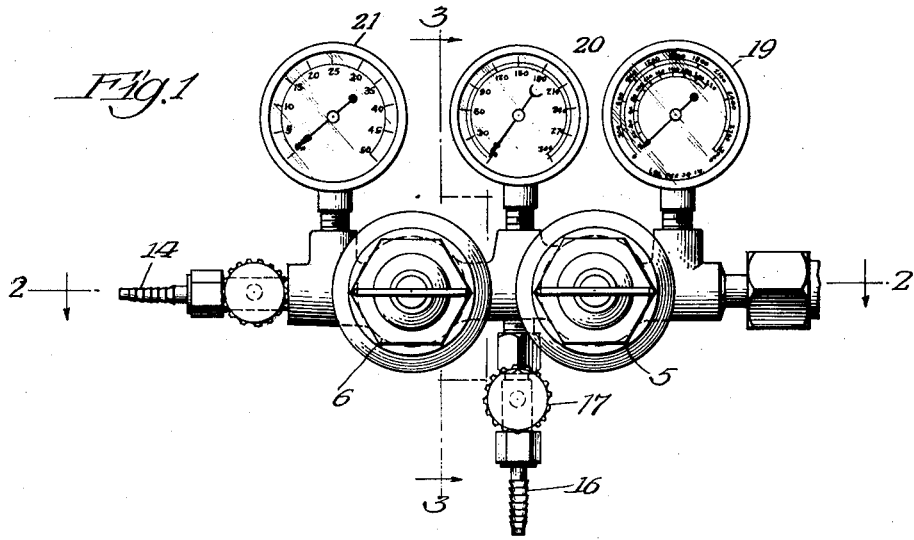
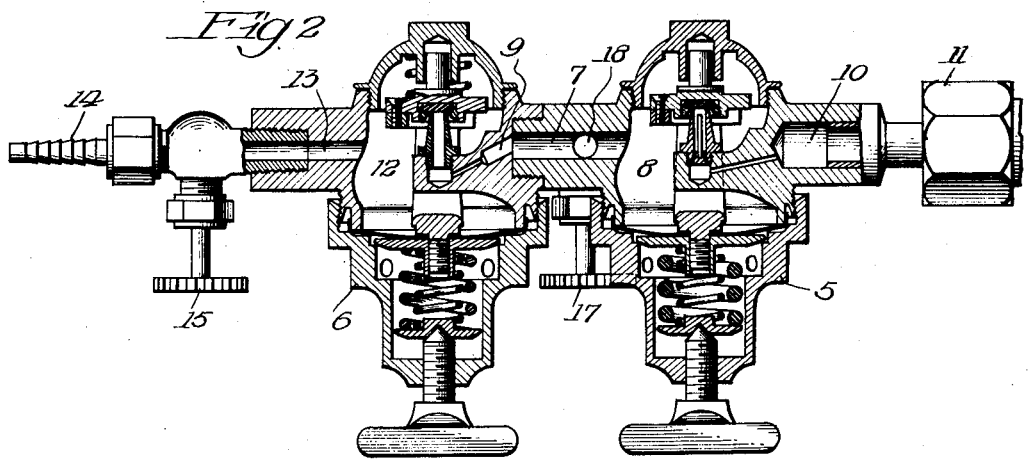
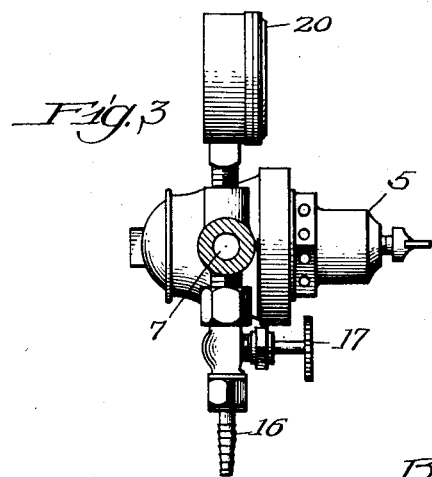
Inventor:
Charles L. Bastian
By Wm. O. Bell, Atty.

Patented Oct. 15, 1929

1,731,519

UNITED STATES PATENT OFFICE

CHARLES L. BASTIAN, OF CHICAGO, ILLINOIS, ASSIGNOR TO THE BASTIAN-BLESSING COMPANY, OF CHICAGO, ILLINOIS, A CORPORATION OF ILLINOIS

TWO-STAGE FLUID-PRESSURE REGULATOR

Application filed July 23, 1926. Serial No. 124,323.

In the use of gas from a supply tank for cutting and welding it is customary to employ regulators for reducing the pressure as required for the cutting or welding torch. The tank pressure will vary all the way from two thousand pounds down to zero and the drop in the outlet pressure from the regulator is sometimes one pound for every one hundred pound drop in the inlet pressure to the regulator. Therefore, it is necessary to readjust the regulator from time to time in order to maintain an approximately accurate pressure at the torch, and such readjustment depends upon the attention and skill of the operator.

In the oxy-acetylene field there are two different types of regulators, one constructed for the delivery of high pressure of from one hundred to three hundred pounds for cutting, and one constructed for delivery of pressure around fifty pounds or less for welding and other purposes. It is also customary to substitute these regulators on a gas supply tank according to the pressure that may be desired, for example, for cutting or for welding. This not only requires two separate and independent regulators, but it involves the labor of substitution, which may be required more or less frequently, and it also involves the element of care in selecting the proper regulator and skill in the application and use of the regulator.

One of the principal objects of this invention is to provide a single regulating unit to be applied to a gas supply tank for controlling the delivery of gas from the tank to a cutting torch or to a welding torch or for other purposes requiring relatively high and low pressures.

Another object of the invention is to provide means of simple character for controlling and delivering gas from a source of supply at a more constant and uniform pressure than has been customary heretofore and regardless of the drop in pressure at the supply.

And a further object of the invention is to deliver gas from a source of supply to the work through a two-stage unit whereby in the first-stage the pressure may be reduced to a pre-determined degree so that in the second-stage the gas is received at a constant pressure, regardless of the drop in pressure at the source from the maximum to the pre-determined degree, and whereby the second-stage regulation is unaffected by the drop in the supply pressure.

In the accompanying drawings I have illustrated a selected embodiment of the invention and referring thereto:

Fig. 1 is a plan view of the two-stage regulator.

Figure 2 is a sectional view on the line 2—2 of Figure 1.

Figure 3 is a sectional view on the line 3—3 of Figure 1.

Referring to the drawings the invention comprises a first-stage regulator 5 and a second-stage regulator 6 mounted one upon the other in unit form and having a passage 7 connecting the outlet chamber 8 of the first-stage regulator with the inlet passage 9 of the second-stage regulator. The inlet 10 of the first-stage regulator has a connection 11 with a tank or source of supply (not shown). The outlet chamber 12 of the second-stage regulator is connected by a passage 13 with a hose connection 14 and this connection may be provided with a valve 15. A hose connection 16 provided with a valve 17 is connected by a passage 18 with the passage 7 between the two regulators. A pressure gauge 19 is connected with the passage 10 for indicating the degree of pressure at the supply; a pressure gauge 20 is connected with the passage 7 to indicate the degree of pressure delivered from the first-stage regulator; a pressure gauge 21 is connected with the passage 13 to indicate the degree of pressure delivered from the second-stage regulator to the work.

It will not be necessary to enter into a detail description of the construction of each of the regulators for my invention does not depend upon the particular construction of the regulator except as it is desirable to provide efficient regulators adapted for the purpose and connect them in the proper manner as a unit as shown and described. The regulator construction which I have shown herein to illustrate the invention is substantially the same as covered by my Patents No. 1,394,395, October 18, 1921, and No. 1,408,926, March 7, 1922.

The operation of my invention may be illustrated by reference to its use as a single unit upon the usual gas supply tank for cutting and for welding. It will be assumed that the supply tank contains the maximum pressure of two thousand pounds; and that a cutting pressure of one hundred and fifty pounds and a welding pressure of twenty-five pounds are desired. The first-stage regulator 5 will be set to reduce the pressure from the tank to one hundred and fifty pounds; the second-stage regulator 6 will be set to reduce the pressure from the first-stage regulator to twenty-five pounds. The cutting torch will be connected to the connection 16 and the welding torch to the connection 14. This regulating unit thus provides for taking gas from a supply and delivering it at different pressures to work, in this illustration cutting and welding. And it will be understood that the two operations of cutting and welding may be carried on at the same time by different operators independently of each other, or one operator may shift between cutting and welding without detaching any parts but by simply operating the valves 15, 17. This greatly simplifies and facilitates the use of gas from a supply at different pressures for different kinds of work, and it entirely avoids the necessity for employing two separate regulators to be substituted one for the other on the supply as different work is required.

If the regulator 6 only were mounted on the tank for supplying welding pressure it would be found that the pressure delivered to the work would vary as the pressure dropped at the supply. But with my invention the first-stage regulator is set to reduce the supply pressure, according to the illustration above, to one hundred and fifty pounds, and the second-stage regulator operates upon this one hundred and fifty pound pressure to reduce it to twenty-five pounds. There is, of course, a certain variation in the pressure delivered from the first stage-regulator because of the pressure drop at the supply, but it may be said that the second-stage regulator is operating upon a comparatively constant pressure which varies but little from the one hundred and fifty pounds until the supply pressure drops below one hundred and fifty pounds whereupon the gas will flow freely through the first-stage regulator. The advantage of this two-stage regulator consists largely in the fact that the second-stage regulator receives the gas at a comparatively constant pressure regardless of the drop in pressure at the supply, and therefore the second-stage regulator can operate with greater efficiency to supply a constant and uniform pressure to the work. Also while the pressure is being supplied at twenty-five pounds to the welding torch through the connection 14 pressure at one hundred and fifty pounds may be supplied to a cutting torch through the connection 16 and this is accomplished without affecting either pressure.

I have specified certain pressures herein for purposes of illustration in describing the invention but it will be understood, of course, that other pressures may be provided for and that the invention may be used for other purposes than cutting and welding. Also, it will be undertsood that I do not limit myself to the specific construction and arrangement of parts herein shown and described but that I reserve the right to make any changes that may be usual or desirable within the scope of the following claims.

I claim:

1. A pressure regulator for the delivery of oxygen for both heating and cutting purposes from a single source, including a high pressure regulator of the spring pressed diaphragm type having an inlet adapted to be connected to the high pressure source of oxygen and an outlet for delivering the oxygen at a pressure suitable for cutting, a second low pressure regulator also of the spring pressed diaphragm type having an inlet connected to the outlet of the first mentioned regulator and an outlet adapted to deliver oxygen at a pressure suitable for welding or heating flame formation, a hose connection at said last mentioned outlet for delivering oxygen to a burner for heating, and a separate hose connection between the outlet of the first mentioned regulator and the inlet of the second mentioned regulator for delivering oxygen to the same burner but at a higher pressure for cutting.

2. An article of manufacture comprising a pair of pressure regulators of the spring pressed diaphragm type connected in series, the first regulator having a heavy spring and small outlet for delivering oxygen from a pressure of 1000 pounds or more to a pressure suitable for oxy-acetylene cutting, and the second regulator having a lighter spring and larger outlet for delivering oxygen from the second mentioned pressure to a pressure suitable for an oxy-acetylene heating or welding torch, and a pair of valve controlled hose connections, one at the outlet of the second regulator and one between the two regulators, whereby oxygen for both heating and cutting may be delivered from a single high pressure source to a torch.

CHARLES L. BASTIAN.